Sept. 4, 1962 D. H. LUXTON ETAL 3,052,041
TEACHING MACHINE
Filed July 6, 1959 4 Sheets-Sheet 1

INVENTORS:
DEAN H. LUXTON
ROBERT E. CORRIGAN
BY
Angus & Mew
ATTORNEYS.

Sept. 4, 1962  D. H. LUXTON ETAL  3,052,041
TEACHING MACHINE
Filed July 6, 1959  4 Sheets-Sheet 2

INVENTORS:
DEAN H. LUXTON
ROBERT E. CORRIGAN
BY
Angus & Mow
ATTORNEYS.

Sept. 4, 1962  D. H. LUXTON ETAL  3,052,041
TEACHING MACHINE

Filed July 6, 1959  4 Sheets-Sheet 4

INVENTORS;
DEAN H. LUXTON
ROBERT E. CORRIGAN
BY
Angus & Mon
ATTORNEYS.

United States Patent Office 3,052,041
Patented Sept. 4, 1962

3,052,041
TEACHING MACHINE
Dean H. Luxton, Anaheim, and Robert E. Corrigan, Garden Grove, Calif., assignors to Rheem Manufacturing Company, Inc., South Gate, Calif., a corporation of California
Filed July 6, 1959, Ser. No. 824,984
18 Claims. (Cl. 35—9)

This invention relates to teaching machines.

Machines for the purpose of presenting information and tasks to students and checking their answers are known. For example, true-false or multiple choice machines exist by means of which a question is presented to a student and the student indicates his answer by pressing a button which actuates circuitry which indicates whether the student pressed the button corresponding to a correct answer. However, no presently known machine enables a student to do more than to select one of a number of ready-made answers (true-false, or one of several multiple choice answers). The general process is that of providing a question and a plurality of numbered answers, response being by number. No presently known machine permits a student to actually compose and submit a response to the machine, which then judges the correctness of the composed response.

It is an object of this invention to provide a teaching machine with great flexibility wherein text and query material may be displayed, or otherwise presented to the student, so as to assign him a task, and which provides mechanical means whereby the student may compose a response, as contrasted with the mere selection of one of a group of responses submitted to him, as is the situation with multiple choice questions.

A further object is to provide a machine capable of judging the correctness of the response, and, if desired, to provide further instruction to the student should he make an incorrect answer.

A further and related object is to provide such a machine which is of modest bulk and which enables a response to be composed in any notation, thereby providing a universal machine which is unlimited in the scope of fields of knowledge and language in which it can operate.

A teaching machine according to this invention comprises a task source which is capable of storing and presenting a task for the student to respond to. This task source may include the assignment of a problem, or the submission of a question to be answered, and may also include text material, if desired. There is provided a plurality of individually manipulable selector means (such as a key) along with label means for labelling the individual ones of the selector means with some indicia relating to the task assigned at the moment. The indicia for each key may and probably will differ from task to task, and can include letters of the alphabet, numerals, symbols, pictures, or any other indicia necessary for a student to compose the answer. Because any composed response will generally require the use of less than the totality of all numbers, symbols and pictures in the alphabet or symbolism used, the ability of the labelling means to make the different keys bear some indicia relating only to the task at hand and its solution, enables the machine to be substantially reduced in bulk.

A machine according to the invention also includes response storage means which contains data relating to at least one possible response to the task (which may or may not be the correct response), and response comparator means which is actuable by manipulation of the selector means, and which is adapted to compare the response given with the data stored in the storage means.

According to a preferred but optional feature of the invention, the label means include indicia which are required for composing the correct response to the assigned task, and also include spurious indicia, thereby requiring the student to select the correct indicia from among an assortment of correct and spurious indicia.

According to still another optional but preferred feature of the invention, a teaching machine according to the invention includes a response indicating means which is connected to the response comparator means so as to be actuated to present an indication of correctness when the selector means are properly manipulated to compose the correct response, and, if desired, to refer the student to additional instruction means pertinent to his error should an incorrect response have been given.

The above and other features of this invention will be more fully understood from the following detailed description and the accompanying drawings, in which.

Figure 1:
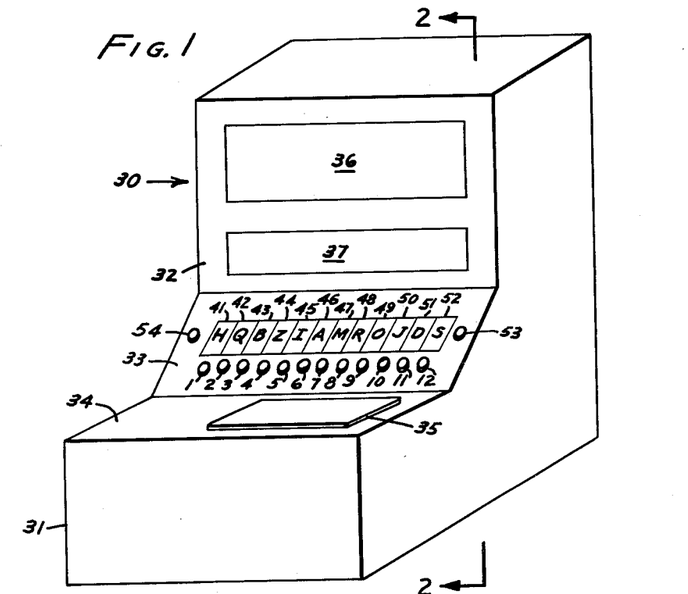
FIG. 1 is a perspective view of the cabinet, selector means, and certain visible components of the presently preferred embodiment of a teaching device according to the invention.

In FIG. 1 there is shown a teaching machine 30 according to the invention. This machine has an outer cabinet 31 with a front face 32, a sloping front panel 33, and a desk surface 34. A scratch pad 35, or the like, may be provided for a student's convenience in composing his answer before operating the machine.

In face 32 of the cabinet there is a task screen 36 and below it there is a response screen 37.

In the sloping front panel there are disposed the means available to the student for actuating the selector means. These comprise, from left to right, twelve selector knobs, 1–12, and immediately above each of the knobs there is disposed a label screen 41–52, respectively. At the right-hand end of panel 33 there is a reset knob 53, and at the left-hand side there is an override knob 54.

Screens 36, 37 and 41–52 are the type which can be illuminated by a picture projected from the rear. Ordinary sandblasted glass screens are efficient enough, but any of the many known types of daylight projection, light-conserving screens of the type which focus light projected thereon into beams of restricted angle may be used instead, if greater light conservation is needed. The type of screen used is immaterial to the invention so long as the images projected thereon are visible to the student.

The elements described this far are those which are available to the student for his study and manipulation. In the operation of this machine, a task and perhaps also text material, is projected onto task screen 36, and the student is required to compose a response, such as a solution to a problem, or the composition of a word or sentence. The student will read the task and text, if a text is provided, will compose his reply on scratch paper, and then will transfer that response to the machine by sequentially operating selector knobs 1–12 in a manner to be described. This ends the student's participation in the machine's function and in one arrangement of the machine, if the student has responded with the correct answer, this correct answer will be shown on response screen 37.

Figures 2, 4, 8:
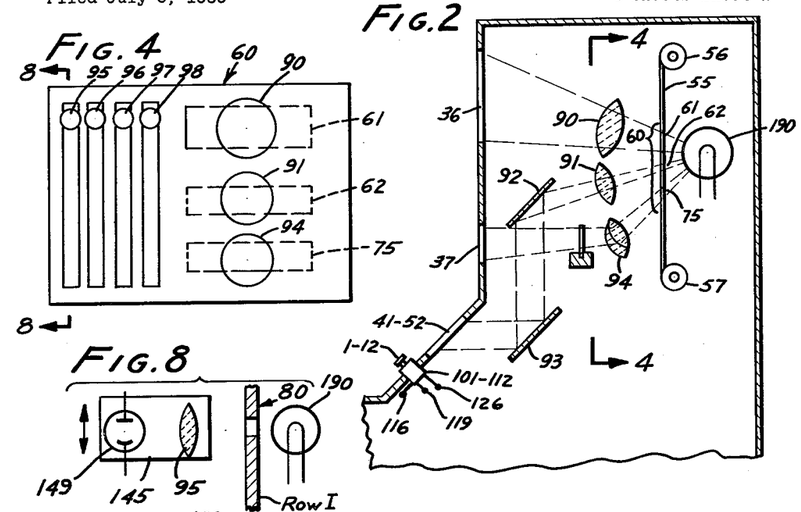
FIG. 2 is a schematic cross-section taken at line 2—2 of FIG. 1.
FIG. 4 is a schematic view showing the relationship between certain lenses and the data storage element as used in this invention.
FIG. 8 is a schematic elevation, partly in cutaway cross-section taken at line 8—8 of FIG. 4, showing the relationship of certain elements in the comparator means of the invention.

Now to a detailed description of the elements within the cabinet. With respect to FIG. 2, certain of the already-disclosed elements are shown in cross-section. Within the cabinet there is a film strip 55 which winds from reel 56 onto reel 57. A selected frame on said film is illuminated by a projection lamp 190. A data storage element 60, comprising a single frame from the film strip, for example the one which is presently illuminated by the projection lamp in FIG. 2, is more fully disclosed in FIG. 3 to which reference should now be had.

Figure 3:
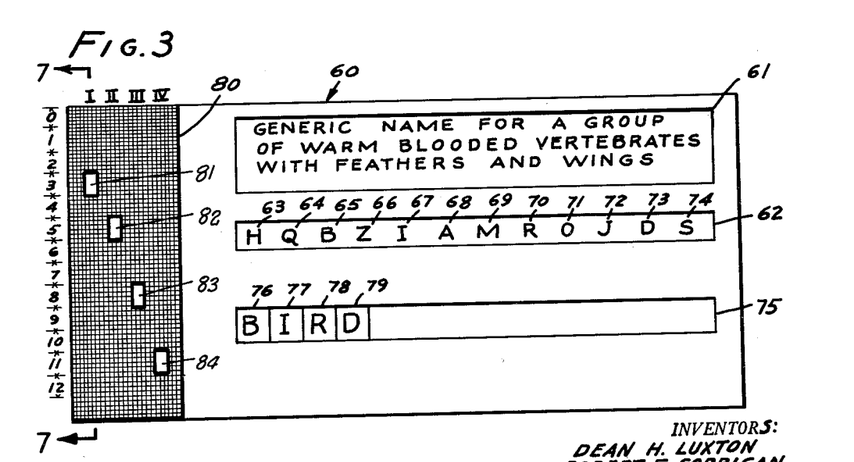
FIG. 3 is a plan view of a data storage element used in this invention.

FIG. 3 shows frame 60 from film strip 55. It will be understood that instead of a frame from a film strip, the data storage element could also be a card with film inserts or printed segments in any projectionable form. Furthermore, the data stored, although preferably in visible form for certain segments of the element and for punchcard notation in other segments, could instead be stored on magnetic tape or other means for audible reproduction. However, the preferred embodiment is as shown, wherein the frame illustrated in FIG. 3 comprises one frame of a strip of frames, each of which bears a different task requiring a different response.

The data storage element 60 includes a task segment 61 which is the segment of the element devoted to presenting the student's task. As illustrated in FIG. 3, the present task is for the student to respond with the generic name for a group of warmblooded vertebrates with feathers and wings, the proper response being "bird." The task words are projected upon task screen 36.

Beneath the task segment of element 60 there is a label segment 62, which segment bears indicia 63–74 which are to be projected upon label screens 41–52, respectively.

Beneath the label segment there is a response indicating segment 75 which bears indicia 76–79 which in the example given correspond to the correct response to the task on the task segment, in this case the letters B, I, R, D, respectively, that is, the word "BIRD" which is the correct response.

The data storage element also includes a response storage segment 80. This response storage segment is shown as a binary address-type unit having four vertical rows I, II, III, IV, each of which has twelve active levels 1–12, respectively, and a zero level, which is inactive. Each of the active levels (and only active levels will hereafter be considered) corresponds to the respective one of the selector knobs which bears the number of the level in FIG. 1. It will be understood that in practice the knobs are not numbered. Their indicia is provided by the label screens. The numbers referred to are solely for the purpose of illustration in this specification. The actuation of selector knob 3, for example, whatever the indicia borne by label screen 43, corresponds to level 3 in the rows, as will later become evident.

The response storage segment is shown shaded so as to indicate that it is opaque, so that there is little or no transmission of light through the shaded section. Certain areas 81, 82, 83 and 84 are shown transparent by way of example, and these correspond to levels 3, 5, 8 and 11 in rows I, II, III and IV, respectively, which, when the label screens are given the indicia shown, corresponds to the word "bird." Thus, screens 43, 45, 48, and 51 bear indicia needed for the correct response. The other label screens bear spurious information. It should be noted here how this technique differs from multiple choice. In multiple choice, a student is always provided with the correct answer, even though it is among a number of incorrect answers. In this technique, the correct answer does not appear anywhere. It is up to the student to compose his own answer, and the indicia may be shuffled as desired. For example, although the levels for the correct response shown in the example are in ascending order, there is no reason that the letter B could not have been assigned to position 74 of segment 62, and level 12 of row I made transparent. Thus, any order of indicia in any combination, is possible with this completely flexible device. Note that the student is not able to select one answer which is correct by pure guesswork. Guesswork with twelve keys to form a single correct four-letter word is so improbable that substantially all possibility of guessing an answer from whatever suggestion may be inherent within the indicia is negligible.

It will be recognized that had the correct response been different from the one given, different levels in each of the rows may, and probably would have, been transparent. There are four rows, and it will be recognized that more or fewer rows could be provided depending upon the length of the answer required. It is believed that the illustration of a four-letter reply is enough to fully illustrate the mechanism, further mechanism merely requiring repetition of what is already shown. However, words or even sentences of indefinite length can be accommodated simply by increasing the number of rows FIGS. 2 and 4 illustrate the relationship of data storage element 60 to certain lenses in the system. Lens 90 is disposed between task screen 36 and task segment 61, and has an aperture which limits the material projected on the task screen to the indicia contained on the task segment.

Lens 91 is suitably apertured to project indicia 63–74 of the label segment, and its projected rays are reflected by mirrors 92, 93 arranged rhombically so as to project the label indicia upon label screens 41–52, respectively.

Lens 94 is disposed between correct-response screen 37 and response indicating segment 75, this lens being a doublet-type for deviating the beam toward the screen. It is suitably apertured for projecting only the information on segment 75.

Lenses 95–98, respectively, are disposed opposite rows I–IV, respectively, and are adapted by means yet to be disclosed to be moved individually up and down their respective rows. Thus, each of lenses 95–98 corresponds to a respective row and is adapted to receive light when transmitted by a transparent section opposite the lens for a purpose to be disclosed. Lenses 95–98 are suitably apertured so as to intercept only light transmitted by transparent portions of their respective rows. In FIG. 8 the relationship between lens 95 and the storage segment 80 is shown relative to a photo-electric cell yet to be described.

Figure 5:
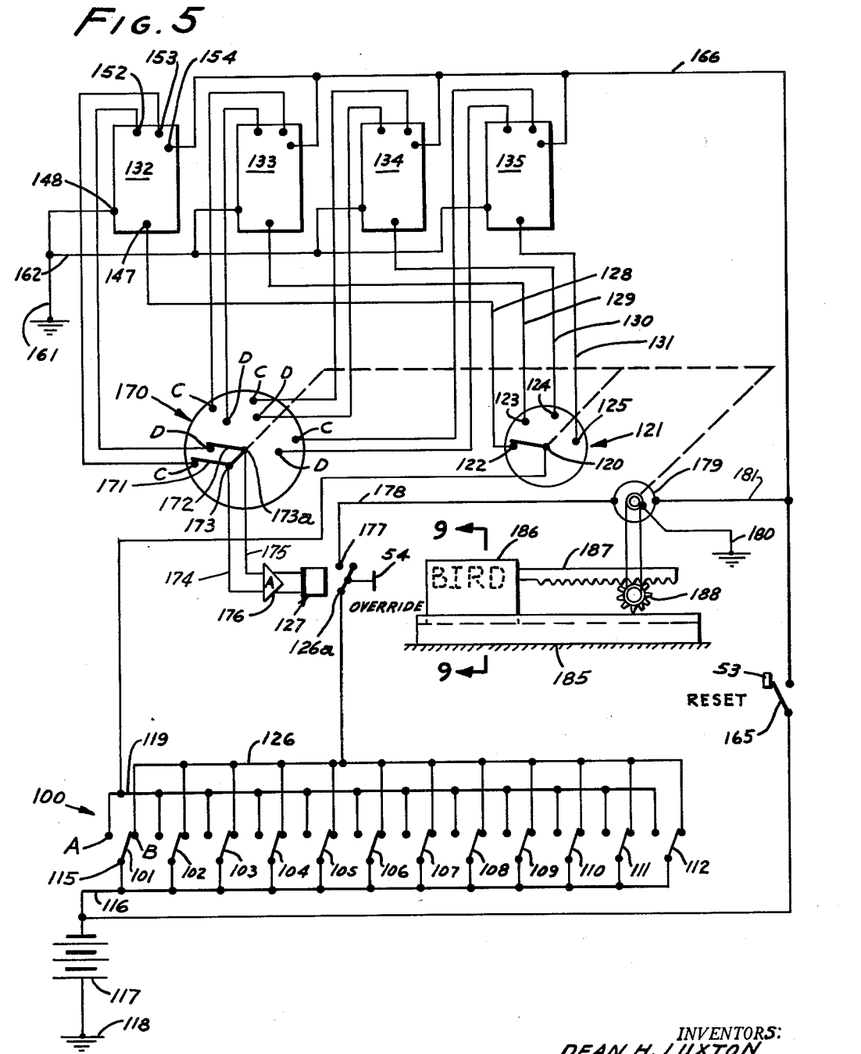
FIG. 5 is a side elevation view, partly in schematic notation, and also showing certain circuitry of the embodiment of FIG. 1.

The control circuit for operating the device will now be described with initial reference to FIG. 5. In FIG. 5 there is shown a selector means 100. This selector means is responsive to manipulation of selector knobs 1–12. Selector knobs 1–12, which are shown in FIG. 1 but not in FIG. 5, actuate respective ones of selector switches 101–112. These selector switches may be stepper switches or any other type of switch which tends to produce stepping impulses. These selector switches are arranged in rank from left to right, selector switch 101 providing a "1" pulse, selector switch 102 providing a "2" pulse, selector switch 103 providing a "3" pulse, and so on until selector switch 112 which gives a "12" pulse, thus providing a pulse proportional to the number of a level in the rows of storage segment 80. Each of the switches has a first terminal 115 which is connected to a bus 116 that is in turn connected to a voltage source 117 which may be a battery or any other desired current source. The voltage source is shown grounded at 118. Each of selector switches 101–112 has an A terminal and a B terminal. The A terminals are all connected to bus 119, bus 119 being connected to the central terminal 120 of a row selector 121.

Row selector 121 has terminals 122, 123, 124, 125 which respectively correspond to rows I, II, III, and IV. The B terminals of switches 101–112 are connected to bus 126. Terminal 126a of relay 127 is connected to bus 126. Relay 127 is spring-loaded open, and override knob 54 is adapted to close the relay by manual operation.

The selector switches are biased to normally make connection between their respective first terminals 115 and their B terminals. When one of the selector knobs is pressed, the switchblade is moved over to make connection between the respective first terminal and the A terminal. Then a number of pulses corresponding to the level of the switch will be provided to bus 119 for disposition in accordance with the setting of equipment later to be described.

When the selector knob that has been pressed is released, the switch bias moves the blade back to again make contact between terminal 115 and the respective B terminal. There is preferably a delay device to slow down the return of the blade to contact with the B terminal.

All of the selector switches provide only one single pulse on their switchover from the A to the B terminal, while they provide a number of pulses proportional to their respective levels in the system when switched from their B to the A condition. Therefore, bus 119 will receive a number of pulses determined by which of the selector switches is moved to contact with its A position when a respective selector knob is pushed, and, regardless of which switch was operated, bus 126 receives only a single pulse when the actuated selector switch is deactuated by the student's releasing the knob.

Terminals 122–125 of row selector 121 are respectively connected by leads 128, 129, 130 and 131 to scanning devices 132, 133, 134 and 135, respectively. The adjustment of row selector 121 will determine which of the scanning devices 132–135 is connected to bus 119, and which therefore receives the pulsing signals from the selector switches.

The position of the row selector 121 is determined by means yet to be described. It is capable of assuming four active positions in the drawings, which is a number equal to the rows involved in the correct response. If more than a four-letter answer is called for, there will be the number of rows in the response storage segment equal to the components of the correct response, and an equal number of scanning devices. There will either be one scanning device for each row and means for actuating it at the proper time, or means for moving a single scanning device along the rows to stop at each row at the proper time for actuation.

Figure 6:
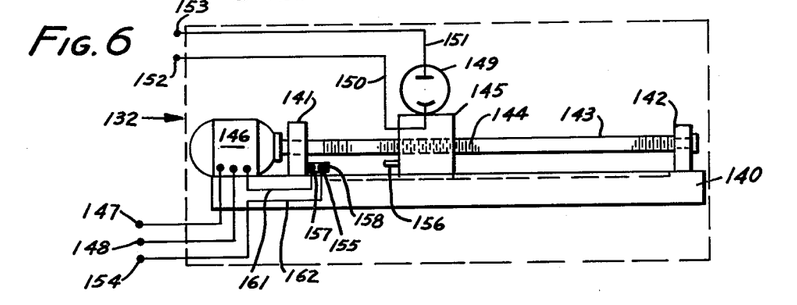
FIG. 6 is a side elevation, partly in schematic notation, of a portion of FIG. 5.

Scanning device 132 will be described here in full detail with reference to FIG. 6, it being understood that scanning devices 133, 134, and 135 are identical to it. FIG. 6 shows a track 140 with a pair of bearings 141, 142. The bearings support a lead screw 143 between them so that the screw can rotate. The lead screw has a thread 144 which is engaged to a slide block 145.

The lead screw is attached to the output shaft of a stepping motor 146 so that rotation of the stepping motor will turn the lead screw and shift the block along the track. Terminal 147 is shown connected to the stepping motor. The stepping motor is a bi-directional type with a split winding and a common ground. One branch of said winding is connected to terminal 147, and to ground to terminal 148.

Terminal 147, which is also shown in FIG. 5, is connected to lead 128 and thus to terminal 122 of row selector 121.

Pulses which are passed by the row selector to terminal 147 by means yet to be described, will cause stepping motor 146 to move the block a distance along the lead screw which is proportional to the number of pulses. Operating selector switch 101 for example will, in a twelve-level installation, move block 145 $1/12$ of its maximum displacement. Actuation of selector switch 108 would move the block along $8/12$ of its maximum displacement. Operating the other selector switches would move them also in proportion to their rank.

The block carries a photo-electric cell 149 and also lens 95 (see also FIG. 8), which focuses any light upon the photo-electric cell which may come through the response storage segment in row I at the level assumed by the lens. Then, if at the final position of the block, the lens for the photoelectric cell is disposed adjacent to a transparent portion in segment 80, a current will be supplied through leads 150, 151 to terminals 152, 153, respectively. Terminals 152 and 153 are shown in both FIGS. 5 and 6.

Figure 7:
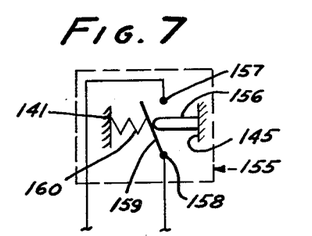
FIG. 7 is an enlarged fragmentary view of a portion of FIG. 6.

Stepping motor 146 is provided with another terminal 154 (also shown in FIG. 5) that is connected to the other branch of the split winding. Current through this branch causes the motor to reverse so as to return the block to a position adjacent left-hand bearing 141. Bearing 141 carries a limit switch 155 shown in full detail in FIG. 7, while block 145 carries a stud 156. Limit switch 155 has two terminals 157, 158 which can be interconnected by a switchblade 159. The switchblade is biased toward the switch closed position by a spring 160. Movement of the block all the way to the left will cause stud 156 to strike switchblade 159 and open the circuit between terminals 157 and 158 shown connected by leads 161, 162 to the motor, and to terminal 154, respectively.

All ground terminals 148 are connected to ground 161 through bus 162.

A reset switch 165 is connected to busses 116 and 166. Bus 166 is connected to all reset terminals 154 so that closing the reset switch will operate all stepping motors which correspond to stepping motor 146 until they return the blocks to their left-hand positions as shown in FIG. 6, at which time their respective limit switches will open and stop further resetting movement. Such an action would reset all photo-electric cells at zero level.

The disposition of the output of the respective photo-electric cells in the scanning devices from terminals 152 and 153 will now be described. A selector 170 of the type having C and D terminals and a pair of contact leaves 171 (for C terminals) and 172 (for D terminals), which leaves are insulated from each other and which are rotatably mounted, is adapted to have respective members of pairs of C and D terminals connected for any one of the four active possible settings of the contact lead illustrated. Thus leaves are pivotable around points 173 and 173a so as to contact at C and D terminals. In the drawings, the leaves are shown connecting the C and D terminals that connect to terminals 152 and 153 of scanning device 132. A circuit is thereby made from a selected one of scanning devices 132–135 (in the example shown, from scanning device 132) to leads 171, 172 which connect to an amplifier 176, the output of which is provided to the winding of relay 127. Current from the amplifier actuates the relay so as to make a connection between relay terminals 126a and 177 so as to provide a connection between bus 126 and a lead 178 which goes to a stepper motor 179.

Stepper motor 179 is a split winding motor with a common ground 180, lead 178 connecting to one branch of the winding, and lead 181 which is connected to reset bus 166 driving the motor in the other direction. It will therefore be seen that a pulse supplied to lead 178 while relay 127 is closed causes the stepper motor to operate one step in one direction, while closing reset switch 165 will cause the motor to operate in the reverse direction.

Figure 9:
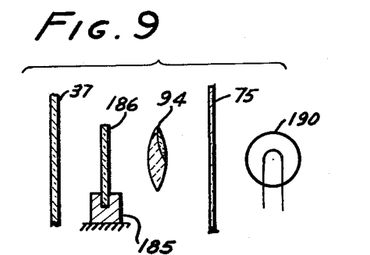
FIG. 9 is a schematic elevation, partly in cutaway cross-section taken at line 9—9 of FIG. 5, showing the relationship of certain elements in the correct-response indicating means of the invention.

In FIG. 5, there is also shown a track 185 with a shutter 186 slidably mounted therein. To shutter 186 there is mounted a rack 187. A pinion 188 mounted to the track is turned by the stepper motor. The pinion meshes with the rack so that a pulse from lead 178 will withdraw the shutter by one unit from the optical path between the response indicating segment and response screen 37. The physical relationship between these elements is shown in FIG. 9, and also in lesser detail in FIG. 2.

Stepper motor 179 is the motive means for driving both the row selector 121 and selector 170 in addition to shutter 186. The selectors will have corresponding rotary positions, and will also be simultaneously reset. A limit switch similar to that shown in FIG. 7 may be incorporated in the reset circuit of stepper motor 179 if desired.

In addition to storage of data relating to the correct answer, this device is also adaptable to storing data relating to incorrect answers. Inasmuch as particular incorrect answers frequently indicate the lack of adequate comprehension of certain areas of knowledge, the ability to recognize a particular incorrect answer enables the teaching machine to provide the student with instruction relating to his particular deficiency.

Figure 10:
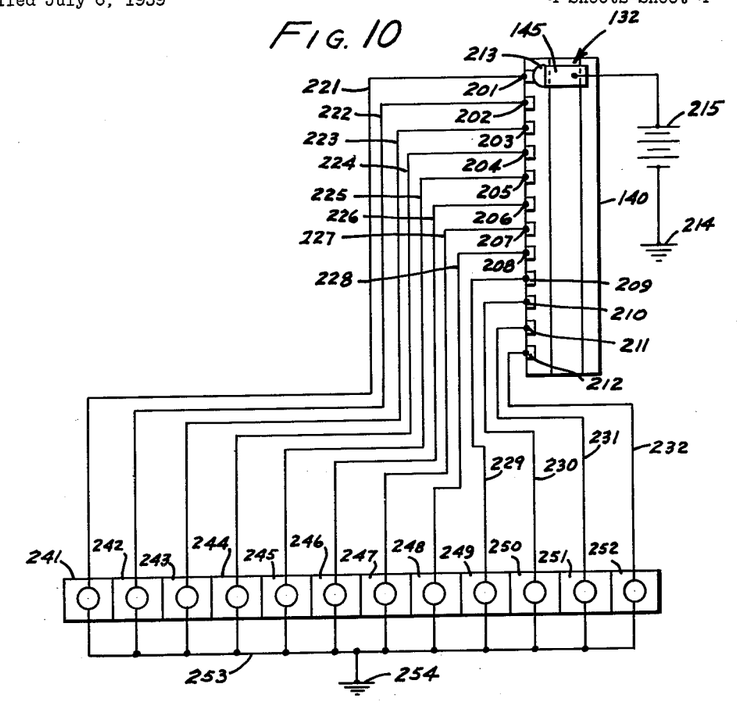
FIGS. 10 and 11 are combined elevation and circuit drawings of optional portions of the invention.

There are numerous ways that this secondary instruction can be carried out. One form is shown in FIG. 10, where information relating to various answers is stored for display in a separate unit. It is to be understood that FIG. 10 is conceptual in nature, and that each instruction unit shown therein could correspond to a new data storage element in teaching machine 30, thereby requiring the student to prepare a correct response to a task of a remedial nature.

In FIG. 10, instruction feedback means are shown in connection with track 140. This track is shown provided with twelve contacts 201-212 adapted to be individually contacted by a contact 213 mounted to carriage 145. Contact 213 is permanently connected to ground 214 through a voltage source 215. Contacts 201-212 respectively correspond to levels 1-12 of the row with which the scanning means that includes track 140 is associated, and each scanning device may include such an arrangement, if desired.

Contacts 201-212 are connected by leads 221-232 to feedback storage units 241-252, respectively. The circuits through the remedial storage units are all connected to bus 253, which is grounded at 254. Each storage unit may be a frame of a film strip and a screen for showing it as single examples.

In the operation of this device, it may be desired to scan the settings of the scanner devices prior to moving the shutter, so that a slightly incorrect answer may be accepted. Lead 152, 153 (FIG. 11) from scanner devices 132-135 are shown connected to a scanner 260 which may be set to provide a current to amplifier 261 when a given percentage of correct responses are given, say three out of four correct letters, or even for the total correct answer, if preferred.

Figure 11:
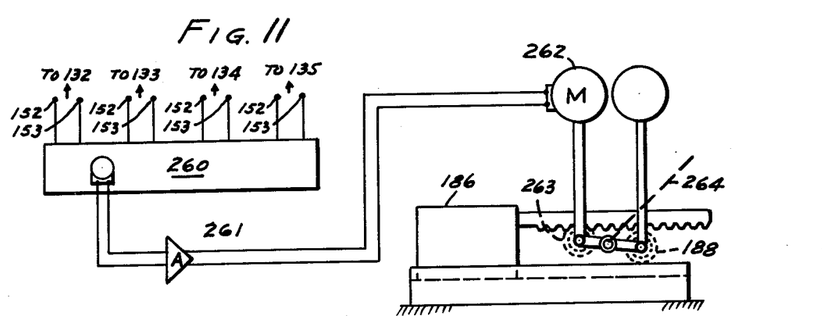

Amplifier 261 powers motor 262 which is engageable through pinion 263 to move shutter 186. A selector arm 264 is provided to select either pinion 188 or 263 to operate the shutter. The circuit to motor 262 can be provided with limit switches to limit its movement, similar to switch 155, if desired. Reset can be accomplished with motor 179.

The arrangement of FIG. 11 allows the correct answer to be recognized, even if it has the likeliest errors therein, such as a common misspelling error. It can also be used to scan a final setting of all block positions, to operate motor 262 to withdraw shutter 186 after a full complete answer, by closing override switch 54 and disengaging pinion 188 from the rack.

For convenience in discussion, certain elements will now be blocked out in their general relationship. The term "task source" is sometimes used herein to include the combination of task segment 61 of the data storage element, together with the task presentation means which includes task screen 36 and its respective lens 90.

The term "label means" as used herein includes label segment 62 and the indicia presentation means which includes label screens 41-52, lens 91, and any associated optical element such as mirrors 92 and 93.

The term "comparator means" includes scanning devices 132-135 and the row selector 121.

The term "response recognition means" is sometimes used to comprehend the response segment 80 of the data storage element and the comparator means.

The term "response indicating means" is sometimes used herein to comprehend response indicating segment 75 of the data storage element, together with the response presentation means which include the shutter 186, the portion of stepper motor 179 concerned with moving the shutter, relay 127, selector 170, and bus 126.

The term "selector means" comprehends the manipulable knobs and selector switches 101-112.

The term "data storage element" includes task segment 61, label segment 62, response indicating segment 75, and response storage segment 80.

The term "instruction feedback means" comprehends the structure shown in FIG. 10, whereby remedial instruction is provided in response to incorrect answers.

It will be recognized that the segments of the data storage element are included as elements of certain of the means defined above, and that these segments, although a part of the data storage means, are at least part of the intelligence input for some of the other systems, and are therefore in effect part of these systems.

One cycle of operation of this device will now be described. Assuming that response to one problem has just been given, the machine is reset by closing reset switch 165. This connects stepper motor 179 to bus 116 to return shutter 186 to the position shown in FIG. 5, that is, so that it stands in the way of the optical path between response screen 37 and response indicating segment 75, thereby preventing an initial showing of the correct answer to the next task on response screen 37. Operation of motor 179 also resets selectors 170 and 121 so that connection is made to terminals 152 and 153, and 147, respectively, of scanning device 132.

Closure of the reset switch also provides current to all terminals 154 which causes motors 146 to move all blocks 145 toward bearings 141 until limit switches 155 are opened. This places all photo-electric cells 149 and their associated lenses 95 at the zero level of the rows in response storage segment 80. When the limit switches are opened, the individual stepper motors 146 are put out of operation. A similar limit switch may be provided for motor 179, if desired.

Next, reels 56 and 57 are turned by means which may be controlled by the reset switch, if desired, or they may simply be turned manually by a handle (not shown) so that a new data storage element stands before the projector lamp 190.

The lamp illuminates the task segment and flashes its intelligence upon task screen 36 so that the student can read it. Assuming that the question asked is that which is shown in FIG. 3. The student is required to provide the generic word "bird" as an answer.

At this time, the projection lamp illuminates label screens 41-52 with the particular indicia 63-74 from the data storage means as shown in FIG. 3. These indicia 63-74 are projected on individual label screens 41-52 so that each indicia 63-74 corresponds to a respective one of selector knobs 1-12. Therefore, for the particular task at hand, manipulation of selected ones of the selector knobs comprises a response consisting of the particular letter or other indica projected upon the individual label screen. The student now has at hand the task on screen 36 and the indicia on the label screens for him to compose his answer. At this time, he will draft his answer on the scratch pad. Then there will be no "false starts" as far as the machine is concerned.

Assume that the student has reached the correct answer, that is, the word "bird." It will be seen that he must punch the following selector knobs (keys) in this order: 3, 5, 8, and 11. Thus, he will have selected keys corresponding to indicia 65, 67, 70, and 73, respectively.

Now the result of this manipulation will be described with reference to FIG. 5. The closure of reset switch 165 (which is spring-loaded open when not held down), has set the blade of row selector 121 in contact with terminal 122 so as to connect bus 119 with terminal 147 of scanner device 132. The resetting have also moved blades 171 and 172 to contact with the C and D terminals, respectively, which are connected to terminals 152 and 153 of scanning device 132.

When the student presses knob 3, he moves the switchblade of switch 103 over to its A terminal. This switch, being third in rank, provides three pulses of electricity from the voltage source 117. These pulses pass through the row selector and reach terminal 147. This actuates the stepper motor three times so that the block is moves 3/12 of its total lateral movement from zero, and ends up in rod I at the third level.

Reference to FIG. 3 indicates that in row I, the third level has a transparent portion which indicates in this binary notation that the third key is the one which should have been pressed. As can best be seen from FIG. 8, light from the projection lamp passes through this transparent region and is focussed by lens 95 on photo-electric cell 119, which in turn provides current to a circuit connected to terminals 152 and 153.

Again with reference to FIG. 5, the circuit from terminals 152 and 153 is made to C and D terminals of selector 170, and thence to amplifier 176. The output of the amplifier energizes relay 127, holding the blade of the relay closed on terminal 177.

Now when switch 103 is released by the student letting go of knob 3, the switchblade moves off of its A terminal and moves to connect with its B contact. This provides a single pulse to bus 126, which pulses is able to pass through the relay contact to lead 178 (because relay 127 is energized). This pulse cause stepper motor 179 to move by one increment, thereby withdrawing shutter 186 by one unit and permitting the letter B (indicia 76, FIG. 3) to be projected unimpeded from the response indicating segment onto response screen 37. The student can now see the letter B on screen 37. This is an indication that the answer so far is correct.

The stepping over of stepper motor 179 by one unit moves the blades of selectors 170 and 121 so that blades 171 and 172 now make contact with the C and D terminals which relate to scanning device 133, and so that the blade of row selector 121 makes contact with terminal 123.

The student next presses selector knob 5, which is equivalent to selecting the letter I, that is, indicia 45. Selector knob 5 closes selector switch 105 (FIG. 5). The switchblade moves over to make contact with its A terminal, and provides five pulses to bus 119 which are transmitted by the row selector to scanning device 133, which relates to row II. The operation of scanning device 133 is the same as that previously described in connection with scanning device 132, except that the lens and photoelectric cell are in row II, and by the five pulses, are lowered to the fifth level. At the fifth level, there is a transparent portion which lets light from lamp 190 impinge on the photo-electric cell. This in turn provides a current to terminals 152 and 153 of selector 133, and current is again provided to relay 127 for closing that relay and permitting the single pulse which occurs when switch 105 returns to its B terminal to go to stepper motor 179 for stepping the shutter over one more unit, thereby permitting the letter I (indicia 77) to be projected onto response screen 37. This is an indication that the second manipulation was correct.

The operation of stepper motor 179 again moves selectors 170 and 121, so that they make connections appropriate to actuation of scanning device 134, which relates to row III. For the letter R, the student presses key 8 which provides pulses for causing scanning device 134 to seek out the eighth level in row III, at which level row III is transparent, thereby providing for a current from the photo-electric cell that causes relay 127 to close, and stepper motor 179 to receive a pulse when switch 108 again returns to contact with the B terminal. Connections are then made by selectors 170 and 121 to scanning device 135, which relates to row IV, and the shutter is withdrawn by another unit so that the letter R is projected on screen 37.

The students next selects the letter D by pressing selector knob 11 which causes the photo-electric cell and its lens in scanning device 135 to seek out the eleventh level in row IV. Row IV is transparent at this level. As before, this provides for a current that energizes relay 127, so that the pulse caused by the release of knob 11 actuates stepper motor 179 to move the shutter another unit, thereby projecting the letter D on screen 37. The entire word "BIRD" is now projected to show the correct answer.

When the shutter is moved to expose the fourth letter, the blades of selectors 170 and 121 move beyond all of their contacts, there being no indicia to be selected and judged. Resetting will return them to the position shown in FIG. 5. Relay 127 will be provided with a sufficient delay in releasing its blade after selector 170 is moved off of the contacts through which energizing current is provided that the pulse to step motor 179 will not be self-interrupted.

The student has now composed the required four-letter word, and the fact that he has done so has been indicated by withdrawal of shutter 186 from the optical path between the response indicating segment 75 and the response screen 37. The student is now prepared for the next problem which may be brought on by closing reset switch 165 which, as heretofore stated, returns selectors 170 and 121 so that they make their connections with the scanning device 132 relating to the first row and so that the shutter is moved to the position shown in FIG. 5 to blank out the intelligence of the response indicating segment from the response screen. The process may now be gone through with the next data storage element which is placed in front of the projection lamp, the next problem involving a different task, and probably different indicia for the selector means.

The above procedure related to manipulation corresponding to a correct response. Assume, however, that instead of the correct letter B for the first selection, the student for some reason selected the letter A. He would then have pressed selector knob 6 which corresponds to the sixth level of row I. Six pulses would have been provided to terminal 147 of scanning device 132 and the photo-electric cell and its lens in that scanning device would have been moved down to the sixth level in the first row.

The sixth level of row I is not transparent, so no light would reach the photo-electric cell, and no current would have been provided by the cell to terminals 152 and 153. Therefore, relay 127 will have remained open, and the pulse occasioned by the return of the switchblade in switch 106 to contact with its B terminal will not have been transmitted to lead 178 or to stepper motor 179. Therefore, the shutter will not have been withdrawn, and the stepper motor will not have been stepped to move the selectors 170 and 121 to make contact with the next scanning device 133. Thus, the student is unable to go on to the next letter, and this is an indication that an error has been made.

Assume, however, that it is desired to permit the correct answer to be shown on screen 37, regardless of an error made in the selection of a particular letter. For this purpose, override button 54 may be held down so as to allow the pulse occasioned by the return of the switchblade in the selector switches to the B terminals to pass to stepper motor 179 regardless of whether the correct answer had been given or not. Then the stepper motor will step over to withdraw the shutter and show the correct answer regardless of whether or not the student was correct. Note, however, that if the override button is held down, the machine as presently set up will not indicate whether the student's answer was correct or not.

If desired, the override switch may be provided with means for providing a single pulse to the stepper motor upon being closed by pressing the override so as to step the motor over without requiring operation of the selector switches.

The attachment shown in FIG. 10 has as its purpose the provision of instruction feedback to a student who makes an incorrect answer. With this attachment, the response recognition means not only is capable of determining whether the response is correct or not, but is also capable of actuating the feedback device to give further instruction to the student.

Each feedback storage unit 241–252 is connected to a given level in a scanning device. Now if row I is in question, and key 3 is pressed, the answer is correct, and the block seeks the third level. This makes a connection between contacts 203 and 213, and runs a current through lead 223 to feedback storage unit 243. Because the answer is correct, perhaps no further information is provided by unit 243. If the feedback storage unit comprises a film strip, the portion projected on the screen of unit 243 may simply be blank.

However, say that the wrong key, such as key 2 were pressed. Then the block would move to the second level, and contacts 202 and 213 would meet. Then a current would pass to unit 242. Assume that key 2 corresponded to a frequently-encountered error. Then the portion of a film strip projected by unit 242 might be remedial instruction, or instruction to refer to a text, or might refer to another data storage element to be substituted for the one to whose task the incorrect answer has been given. There may be such feedback instruction for each wrong answer, and there may be such a means as shown for each row, or the device shown may be switched from row to row, or it may be adapted to be responsive to a totally incorrect answer. The important feature is that this machine is enabled to determine a student's level of attainment, even by judging incorrect answers, and to give further instruction on this basis.

There are various means for permitting the correct answer to be exposed, even in the event of slight misspellings. Surveys have been made relating to mis-spelling of common words, and it has been found that in most cases when the consonants are in correct order, that the word was a correct composition, even though mis-spelled. In the case of the word "BIRD," if the letters B, R, and D existed, it is reasonably certain that the word "BIRD" was intended even though some one of other letters than I was selected. It is possible with this device to incorporate means for comparing the conditions of the scanning devices 132–135 after all four have been set, and determining whether, say, three out of four of the letters were chosen correctly, in which case the stepper motor could be actuated to remove the shutter entirely and indicate that even with some slight mis-spelling, the answer was probably correct. However, this is a refinement which is not necessary to the invention.

Such a means is shown in FIG. 11. Override switch 54 is closed so that selectors 121 and 170 can be stepped over even if the wrong response is given, and selector 264 (FIG. 11) is moved so that pinion 263 engages the rack instead of pinion 188. Then each scanning device can be set. Thereafter, scanner 260 scans their positions. The scanner is of the type which can be set to accept all or any percentage of the correct answer, and if the selected percentage is correct, then motor 262 is operated to withdraw the shutter to disclose the correct response.

Reset is accomplished by disengaging pinion 263, engaging pinion 188, and closing the reset switch.

It will be noted that although only four scanning devices have been shown in the example, more or fewer could be provided, depending upon the length of the answer required. It will be seen that if this were a true-false device or multiple choice, only a single scanning device would be required. The additional units are provided to make this device completely flexible so as to be able to handle answers of any length whatever. Its principal sophistication resides in its ability to provide means for composing answers of greater length than merely true-false or multiple choice, and with any indicia, the indicia applied to the particular keys being changeable from task to task.

It will be noted that means are not provided in the disclosed device for "painting" the student's actual answer on some screen. This could be accomplished if desired; however, the complexity of the computer required might raise the cost of the machine beyond the capacity of schools to pay for it, and the additional advantages of such a feature might not merit the additional cost.

The exceptional flexibility of this system can now be fully understood. As illustrated, with twelve selector knobs, a response of any length whatever can be constructed which requires no more than twelve indicia to compute it. Of course, additional rows must be provided in the response storage means, together with comparator means adapted for the additional rows. However, this merely involves more of the same circuitry already shown.

If more indicia than twelve are required, then of course more selector knobs and label screens can be provided just as more scanning devices can be provided if a longer response is necessary. The screens can be labelled with any type of indicia, whether mathematical, symbols, pictures, or any kind of alphabet. It will therefore be seen that this invention provides in a machine of small bulk, a completely universal device able to operate in any language, terminology or symbolism, which requires only a few actuating knobs or keys as contrasted with the tremendous bulk which would be required if an individual key had to be provided for every possible symbolic notation. This machine thereby overcomes the limitations of previous machines in that it is completely flexible in its notation, and that no more notation than that actually required for the problem need be provided in the machine for any given problem setup, although spurious notations may, and usually will, also be provided.

The ability of this machine to function without a computer is another of its advantages. There is no need to resort to computers to determine the accuracy or inaccuracy of the answer, the means for checking the response being contained in a small portion of the data storage element itself. The text, indicia, and all other required features of this device can be completely set up in the simple film strip or other data storage element. It is easy for a text, query and answer to be made up on film strips or cards, or by any other means, by a classroom instructor.

Numerous modifications of the device may be devised by persons skilled in the art after reading the above specification, which still would fall within the scope of this invention. Therefore, this invention is not to be limited by the embodiment shown in the drawings and described in the description which is given by way of example and not of limitation, but only in accordance with the scope of the appended claims.

We claim:

1. In a teaching machine, means for responding to an assigned individual task comprising: a plurality of separately actuable manipulable selector means adapted to be operated by a student to respond to the task; a data storage element carrying a plurality of labeling indicia, each of said labeling indicia being related to a respective one of said manipulable selector means, a plurality of actuations of the selector means being required for a correct response to the task, none of the labeling indicia constituting the entire correct response in a single actuation all indicia required for a correct response being included among the labeling indicia supplied by the data storage element; an individual display means for each manipulable selector means in substantial proximity thereto; means for displaying each labeling indicia of the data storage element on an individual display means related to the manipulable selector means to which the labeling indicia relates, thereby labeling the manipulable means with individual indicia from which a correct response to the task can be composed.

2. Apparatus according to claim 1 in which the display means are screens, and projector means are provided for projecting said indicia on said screens, whereby the indicia may be supplied twith each task, said indicia being changeable from task to task.

3. A teaching machine comprising: a task source adapted to present a task in intelligible form to a student; means for responding to an assigned individual task comprising a plurality of separately actuable manipulable selector means adapted to be operated by a student to respond to the task, a data storage element carrying a plurality of labeling indicia, each of said labeling indicia being related to a respective one of said manipulable being related to a respective one of said manipulable means a plurality of actuations of selector means being required for a correct response to the task, none of the labeling indicia containing the entire correct response, all indicial required for a correct response being included among the indicia supplied by the data storage element, an individual display means for each manipulable selector means in substantial proximity thereto, means for displaying each labeling indicia of the data storage element on an individual display means related to the manipulable means to which the labeling indicia relates, thereby labeling the manipulable means with individual indicia from which a correct response to the task can be composed; response recognition means comprising response storage means containing data relating to at least one response to the task; and comparator means actuable by manipulation of the selector means and adapted to compare the response given by sequential manipulation of a plurality of the manipulable selector means with the data contained in the response storage means.

4. A teaching machine according to claim 3 in which the label means includes both indicia which are required for the correct response, and also spurious indicia which are not so required.

5. A teaching machine according to claim 3 in which response indicating means are provided, which response indicating means are connected to the response comparator means so as to be actuable thereby in order to present to the student an indication of the correctness of his response after manipulation of the selector means.

6. Apparatus according to claim 3 in which instruction feedback means are provided which are responsive to commands from the response recognition means whereby further instruction may be given to the student as a function of the correctness of the response.

7. Apparatus according to claim 3 in which the comparator means comprises a scanning device receptive to the manipulation of the selector means in the order manipulated, and having an output operatively connected to means indicative of the correctness of the response.

8. Apparatus according to claim 7 in which the means indicative of the correctness of the response comprises a shutter and a projection system, said projection system projecting the correct response, and said shutter being withdrawable as a consequence of correct manipulation of the selector means.

9. Apparatus according to claim 7 in which the means indicative of the correctness of the response comprises instruction feedback means whereby information is provided to the student on a basis determined by the manipulation of the selector means.

10. In combination: a data storage element which includes the following intelligence segments: a task segment bearing intelligence of an individual task to be performed, a label segment bearing intelligence of indicia to be applied to selector means, and a response storage segment bearing intelligence of at least one response to the task; task presentation means adapted to present the intelligence on the task segment to a student; a plurality of individually manipulable selector means; indicia presentation means adapted to provide for individual ones of said selector means a respective indicia from the label segment; and response comparator means actuable by manipulation of the selector means and adapted to compare the response given by sequential actuation of a plurality of selector means with the intelligence stored in the response storage segment.

11. The combination according to claim 10 in which the data storage element includes a response indicating segment, and in which a response presentation means is provided for presenting the intelligence from the response indicating segment after manipulation of the selector means.

12. A teaching means comprising: a data storage element which includes the following intelligence segments: a task segment bearing intelligence of an individual task to be performed, a label segment bearing intelligence of indicia to be applied to selector means, a response storage segment bearing intelligence of at least one response to the task; a task presentation screen; a plurality of selector means; an individual label screen adjacent to each selector means; means for displaying the intelligence on the task segment on the task presentation screen; projection means for projecting indicia from the label segment on individual respective ones of the label screens, whereby individual selector means are caused to bear a conceptual marking of indicia, a plurality of actuations of said selector means being required for the correct response to the task, none of the indicia containing the entire correct response, and all correct indicia being provided for said correct response; comparator means adapted to respond to the sequential manipulation of the selector means and to compare the response provided by said manipulation with the intelligence in the response storage segment; and means actuated by the comparator means for indicating the correctness of the response.

13. Apparatus according to claim 12 in which the comparator means comprises a scanning device receptive to the manipulation of the selector means in the order manipulated, and having an output operatively connected to means indicative of the correctness of the response.

14. Apparatus according to claim 12 in which the means indicative of the correctness of the response comprises a shutter and a projection system, said projection system projecting the correct response, and said shutter being withdrawable as a consequence of correct manipulation of the selector means.

15. Apparatus according to claim 12 in which the means indicative of the correctness of the response comprises instruction feedback means whereby information is provided to the student on a basis determined by the manipulation of the selector means.

16. Apparatus according to claim 15 in which the instruction feedback means includes data pertaining to additional training graded as a function of the correctness of the response.

17. Apparatus according to claim 15 in which the said data stored in the response storage means includes the correct response to the task.

18. A teaching machine comprising: a task source; means for responding to an assigned individual task comprising a plurality of separately actuable manipulable selector means adapted to be operated by a student to respond to the task; a data storage element carrying a plurality of labeling indicia, each of said labeling indicia being related to a respective one of said manipulable means, a plurality of actuations of the selector means being required for a correct response to the task, none of the labeling indicia containing the entire correct response, all indicia required for a correct response being included among the labeling indicia supplied by the data storage element, an individual display means for each manipulable selector means in substantial proximity thereto, means for displaying each labeling indicia of the data storage element on an individual display means related to the manipulable means to which the labeling indicia relates, thereby labeling the manipulable means with individual indicia from which a correct response to the task can be composed; response storage means containing data relating to at least one response to the task; and response comparator means actuable by manipulation of the manipulable selector means and adapted to compare the response given by sequential manipulation of a plurality of the manipulable selector means with the data contained in the response storage means.

References Cited in the file of this patent

UNITED STATES PATENTS

| | | |
|---|---|---|
| Re. 23,030 | Holt | Aug. 24, 1948 |
| 2,213,974 | Baker | Sept. 10, 1940 |
| 2,401,434 | Mills | June 4, 1946 |
| 2,826,828 | Hamilton | Mar. 18, 1958 |
| 2,835,052 | Raich | May 20, 1958 |